United States Patent [19]

White

[11] 4,193,391
[45] Mar. 18, 1980

[54] SOLAR HEATING SYSTEM

[75] Inventor: George White, Asheville, N.C.

[73] Assignee: Whiteline, Inc., Asheville, N.C.

[21] Appl. No.: 775,871

[22] Filed: Mar. 9, 1977

[51] Int. Cl.² ............................................. F24J 3/02
[52] U.S. Cl. .................................................. 126/438
[58] Field of Search .............. 126/270, 271; 237/1 A; 350/296

[56] References Cited
U.S. PATENT DOCUMENTS

| | | | |
|---|---|---|---|
| 1,345,758 | 7/1920 | Folsom | 126/271 |
| 1,951,404 | 3/1934 | Goddard | 126/270 |
| 4,000,734 | 1/1977 | Matlock et al. | 126/271 |
| 4,038,971 | 8/1977 | Bezborodko | 126/271 |
| 4,080,956 | 3/1978 | Dawley | 126/271 |
| 4,135,493 | 1/1979 | Kennedy | 126/271 |

Primary Examiner—Edward G. Favors
Attorney, Agent, or Firm—David M. Carter

[57] ABSTRACT

A system for collection of solar energy by one or more reflectors which concentrate the suns rays on liquid circulating pipes which is part of a collecting and storing system for solar heated liquid to replace or supplement usual sources of heat in heating systems. More specifically, the system comprises one or more bent, preferably parabolic reflectors pivotly mounted on black heat absorbing pipes through which liquid circulates to absorb heat energy from the sun. The reflectors and the pipes are mounted in an open space such as a building roof with adjusting mechanism to pivot and fix the reflectors in different positions. Transparent plates bridge the space between the edges of the reflectors with hooked cross straps to hold the assembly together.

8 Claims, 5 Drawing Figures

SOLAR HEATING SYSTEM

BACKGROUND OF THE INVENTION

This application is related to co-pending application Ser. No. 807,236, filed June 16, 1977 now U.S. Pat. No. 4,127,924.

One of the most efficient ways of collecting heat energy from the sun's rays is to provide a series of interconnected pipes, preferably black for heat absorbtion, with reflectors associated therewith to direct the rays of the sun to the heat absorbing pipes where water or a similar liquid is being circulated there through to storage facilities. An example of this kind of system is shown in U.S. Pat. No. 3,847,136 wherein there is a series of interconnected longitudinal pipes with individual reflectors pivotally mounted thereon. There is also mechanism for adjusting these semi-circular reflectors to different postiions on the pipes to direct a maximum of the sun rays to the heat absorbing pipes.

The prime problem in these solar energy collecting systems is expense. The provision of a system which collects and stores solar energy may be attractive in saving on the high costs of heating and cooling by conventional apparatus such as electrical, gas and oil heat where the cost of the energy is becoming increasingly expensive. However, if a large capital expenditure is required to make and install such equipment, necessitating a long period of amortization of captial expenditure, the system becomes unattractive.

Accordingly, if a system can be devised which may be manufactured and installed economically, the possibility of attracting users falls much more in the realm of reality. In the system shown in U.S. Pat. No. 3,847,136 and like systems in the prior art manufacturing costs are excessive. The reflectors, because of their complexity, are expensive to manufacture. This is also true of the bearing mechanisms shown in FIG. 3 of this patent, as well as the screw shaft adjusting mechanism shown in FIG. 2 thereof.

It is a primary object of the present invention to provide a solar heat collecting system of the type generally shown in the above patent but which not only uses cheap materials but may also be inexpensively manufactured with great labor saving costs.

Another object is to provide such a reflective system which may be completely assembled with a minimum amount of labor.

A further object is to provide a structural system of the above character wherein the pivotal reflectors may be adjusted to the seasonal changes of the position of the earth with respect to the sun to achieve inexpensively a simple and yet rugged adjustment for accomplishing such end result.

A further object is to provide such a solar heat collecting system which is of light construction so that it may be easily installed on places like roofs of buildings.

Another object is to provide such a structural system which will also be strong enough to withstand the ravishes of wind and weather for long periods with low maintenance costs.

Other objects, advantages and salient features of the present invention will become apparent from the following detailed description, which, taken in conjunction with the accompanying drawings discloses a preferred embodiment thereof.

FIG. 1 is a top view of a gang of individual collectors including interconnected heat absorbing piping and a series of reflector units mounted on a roof or the like.

Similar reference characters refer to similar parts throughout the several views of the drawings.

Figure 1:
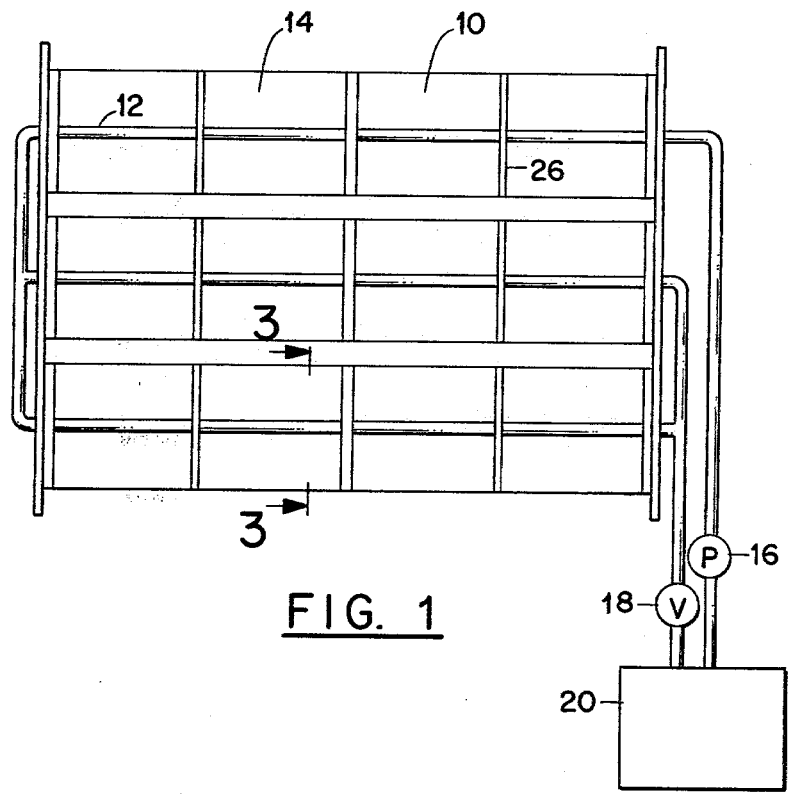
Figure 3:
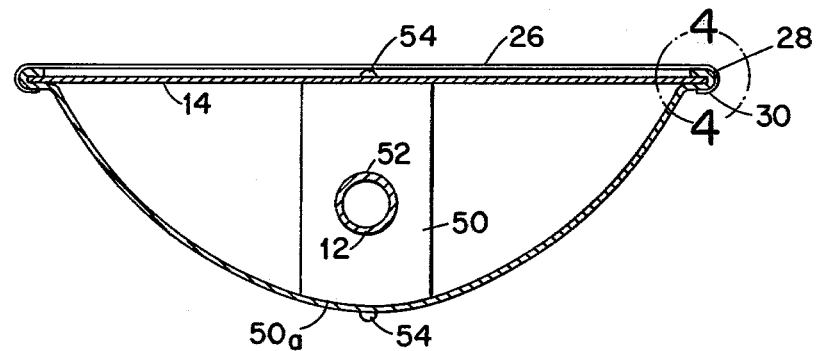
FIG. 3 is sectional elevation taken along the line 3—3 of FIG. 1.

Generally this solar heating system comprises a series of preferably parabolic shaped reflectors pivotally mounted on liquid circulating pipes to direct and concentrate rays of the sun on the pipes thereby heating the liquid flowing through the pipes. As seen in FIG. 1 the system comprises metal reflectors generally indicated at 10 pivotally mounted on pipes generally indicated at 12 having black heat-absorbing surfaces, the reflectors preferably having a parabolic curvature in cross-section as seen in FIG. 3. Translucent covers generally indicated at 14 (FIGS. 1 and 3) fit over the open ends of reflectors 10 and the reflectors are exposed to the suns rays so that they reflect and concentrate the rays of the sun on the pipe 12. The pipes 12 are interconnected in a system including a pump 16, a one-way valve 18 and an insulated storage tank 20, all conventional equipment used in solar heat collecting systems well known in the prior art and herewith shown diagrammatically.

The cross-sectional parabolic shape of the reflectors is designed to maximize the amount of solar heat directed at the heat absorbing pipes 12. As there is a seasonal variation in the position of the earth with respect to the sun caused by the earth's orbit thereabout for maximum efficiency the reflectors must be adjusted seasonally to achieve maximum direction of the sun's rays against the pipes as the seasons change. For this purpose there is a bar generally indicated at 22 (FIG. 2) pivotally connected to the end of the reflectors which when moved longitudinally pivots the reflectors on the pipes to a position for maximum solar heat absorbtion at different seasons of the year.

Figure 4:
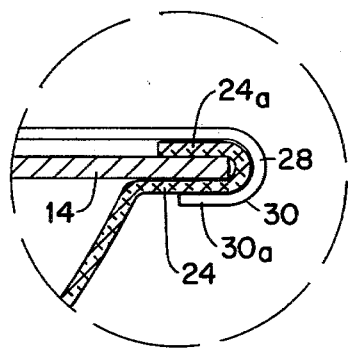
FIG. 4 is a greatly enlarged fragmentary sectional view showing the end hook section of a metal strap used to hold the parts together and FIG. 5 is an end elevation of one of the reflector units shown in FIGS. 1 and 2.

Preferably the reflectors 10 are formed from polished aluminum sheets which have longitudinal flange portions 24 (FIG. 4) which are substantially horizontal when the reflectors are bent to the position shown in FIG. 3. They are then bent back on themselves to form a vertically spaced horizontal flange portion 24a. Cover 14 fits between flange portions 24 and 24a. As seen in FIGS. 1 and 3 there is provided a plurality of straps generally indicated at 26 extending crosswise over the covers 14, the ends 28 of which are bent back on themselves to form hook portions generally indicated at 30. The metal from which reflectors 10 are made has a certain resilience and when it is bent to take the shape shown in FIG. 3 the hooked portion 30 fits over the flange portions 24 and 24a. The reflectors are designed so that when assembled to the position shown in FIG. 3 resilience still remains in the reflector plate because it has not been bent past its elasticity breaking point. Thus the horizontal flanges 24a continually press against the bottom flange portion 24 and cover 14. Accordingly there is provided a very economical manner of assembling the sheets into the reflectors which reliably holds the assembly together in a simple manner.

Figure 5:
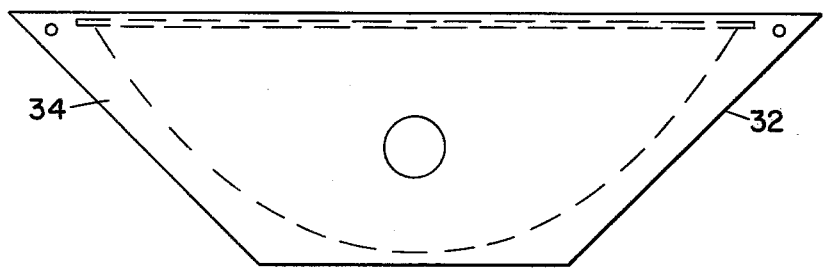

The ends of the reflectors 10 are covered by plates generally indicated at 32, (FIG. 5), also preferably of sheet metal, and preferably connected to the reflectors in any convenient manner. As diagrammatically indicated in FIG. 5, plates 32 are larger than the cross-sectional dimension of the reflectors so that portions 34 thereof extend beyond the outside surface of the reflectors. Bar 22 is pivotally connected to portions 34 of the reflectors in any suitable manner as by rivets 36.

As previously mentioned, bar 22 may be moved longitudinally to adjust the position of the reflectors 12 with respect to the sun. To hold the bar in a desired position there is an arm 38 pivotally connected to bar 22 and to a fastening element 40 attached to a roof or like structure 42. A rack bar 44 is also pivotally connected to block 40 and has teeth generally indicated at 46. A tension spring 47 is connected to arm 38 and bar 44 and there is a pin 49 extending from bar 22. Accordingly bar 22 may be moved longitudinally to adjust the reflectors to the desired position after which the pin 49 is inserted in one of the teeth 46 and held there by spring 47. Thus after adjustment the reflectors are held in the desired position.

Figure 2:
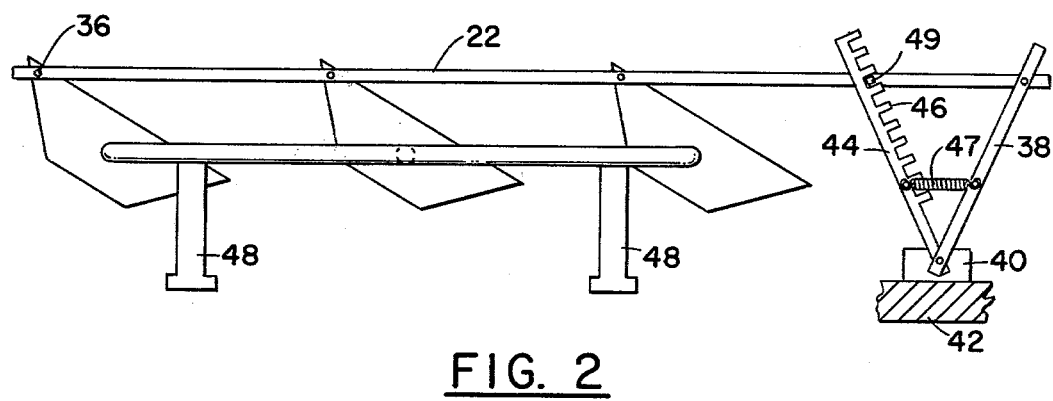
FIG. 2 is an end elevation of the reflectors and absorbing pipes shown in FIG. 1.

Legs 48 support pipes 12 as seen in FIG. 2 and are attached to the roof or supporting structure by any desired means. The rounded outer surface of the reflectors 10 has a reverse flight effect on the entire system as installed. Thus winds instead of pulling the system away from the roof tend to push it toward the roof.

One of the important problems in systems of this general nature is to fasten them to the roof or other supporting structure in such manner that they will not be dislodged by high winds to which they are exposed. Here this reverse flight effect, creating forces toward the roof assists in holding the system in place in adverse weather.

To avoid sagging of the reflectors 10 where they are of substantial length blocks 50 (FIG. 3) may be used substantially in the center of the reflectors. These blocks have a hole 52 through which the pipe 12 extends. Blocks 50 may be held in the shown position by wood screws 54 and the bottom of the block 50a is shaped to accommodate the curved shape of the reflector so that it will form a parabola.

It will thus be seen that the objects set forth above, among those made apparent from the preceding description, are efficiently attained and, since certain changes may be made in the above system without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new is:

1. A reflector structure to be used in a solar heat collecting system having a liquid circulating arrangement, including piping, circulating pump and an insulated storage tank wherein the improvement comprises the combination of: a resilient sheet metal reflector plate; said reflector plate having been bent into a substantially parabolic form below the elastic breaking point thereof; said plate having flange portions extending from its longitudinal edges; at least a portion of said flange portions being substantially horizontal when said reflector plate is in its bent position; a pipe for circulating liquid extending along the focal point of said substantially parabolic reflector plate; a transparent cover plate contacting said flange portions and bridging a space between said flange portions to form an enclosure for said pipe; means for securing said transparent cover plate to said flange portions; means holding said resilient sheet metal reflector in said substantially parabolic form and preventing said resilient sheet metal reflector from springing out of said parabolic form.

2. The combination defined in claim 1 wherein there are one or more straps crossing said transparent cover plate having hooked portions fitting around and under said flange portions.

3. The combination defined in claim 1 wherein there are one or more blocks extending between said transparant cover plate and said reflector plate,
    said blocks having holes to accomodate said pipe.

4. The combination defined in claim 1 wherein there are end plates attached to the ends of said reflector plate having an area larger than the cross sectional area inside said reflector plate so that portions of said end plates protrude from said reflector plate.

5. The combination defined in claim 4 wherein
    said pipe extends through holes in said end plates so that said reflector structure may pivot thereabout.

6. A system which includes a plurality of reflector structures as defined in claim 4 arranged in parallel relationship with a bar pivotally connected to the protruding portions of one of said end plates of each reflector structure unit whereby Said units may be pivoted to adjust their position with respect to the sun.

7. The combination as defined in claim 1 wherein said means for securing said transparent cover plate to said flanges include bent back portions on said flange portions to form two horizontal sections having a vertical space there between;
    said transparent cover plate fitting in said vertical space between said horizontal sections.

8. A reflector structure to be used in a solar heat collecting system having a liquid circulating arrangement including, circulating pump and an insulated storage tank wherein the improvement comprises the combination of: a sheet metal reflector plate having some resilience and bent into a substantially parabolic form to a point below the elasticity breaking point thereof, said plate having angular flange portions on its longitudinal edges which are substantially horizontal when said plate is in its bent position, a transparent cover plate resting on said flange portions and bridging the space therebetween to form an enclosed space and one or more straps crossing said transparent cover plate having hook portions fitting around and under said flange portions; said one or more straps holding said sheet metal reflector plate in its substantially parabolic form and preventing said sheet metal reflector plate from springing out of its substantially parabolic form.

* * * * *